United States Patent
Iwamura (10) Patent No.: US 7,774,603 B2
(45) Date of Patent: *Aug. 10, 2010

(54) WIRELESS DEVICE REGISTRATION

(75) Inventor: Ryuichi Iwamura, San Diego, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 914 days.

This patent is subject to a terminal disclaimer.

(21) Appl. No.: 11/635,356

(22) Filed: Dec. 6, 2006

(65) Prior Publication Data

US 2007/0079123 A1    Apr. 5, 2007

Related U.S. Application Data

(63) Continuation-in-part of application No. 10/379,626, filed on Mar. 4, 2003, now abandoned, and a continuation-in-part of application No. 11/133,961, filed on May 20, 2005, now Pat. No. 7,574,604.

(60) Provisional application No. 60/772,196, filed on Feb. 9, 2006.

(51) Int. Cl.
*H04L 9/00* (2006.01)
*G06F 12/14* (2006.01)
*G06F 11/30* (2006.01)

(52) U.S. Cl. .............. 713/171; 713/172; 713/173; 713/174; 713/185; 713/186; 726/13; 380/255

(58) Field of Classification Search ............... 713/171
See application file for complete search history.

(56) References Cited

U.S. PATENT DOCUMENTS

| 7,574,604 B2* | 8/2009 | Iwamura .................. 713/171 |
| 2003/0208595 A1* | 11/2003 | Gouge et al. ............. 709/225 |
| 2005/0076210 A1* | 4/2005 | Thomas et al. ........... 713/165 |

* cited by examiner

*Primary Examiner*—Longbit Chai
(74) *Attorney, Agent, or Firm*—Blakely, Sokoloff, Taylor & Zafman LLP (57) ABSTRACT

An embodiment of the present invention includes a technique to register a client to a server for communication. A message containing an identification (ID) code is transmitted to a server. If the key is stored in the server, the key encrypted with the ID code is received from the server via a network. The encrypted key is decrypted using the identification code. Otherwise, the key is encrypted using the ID code. The encrypted key is transmitted to the server via the network. Information is exchanged with the server via the network. The information is encrypted and decrypted by the key.

32 Claims, 10 Drawing Sheets

WIRELESS DEVICE REGISTRATION

RELATED APPLICATIONS

This application is a continuation-in-part application of the applications: (1) Titled "Network Audio Systems", Ser. No. 10/379,626 filed on Mar. 4, 2003 now abandoned, and (2) titled "Network Device Registration", Ser. No. 11/133,961, filed on May 20, 2005 now U.S. Pat. No. 7,574,604, all assigned to the same assignee of this application. This application claims the benefit of the provisional application, titled "Optical Device Registration", Ser. No. 60/772,196, filed on Feb. 9, 2006.

BACKGROUND

1. Field of the Invention

Embodiments of the invention relates to the field of audio/video network systems, and more specifically, to device registration.

2. Description of Related Art

Network audio/video systems provide a versatile and efficient way for home entertainment. A typical network audio/video system includes an audio/video server connected to a network to communicate with a number of clients. The audio/video server usually has a hard disk drive (HDD) that can store audio/video data (e.g., music, movies) on hundreds of compact disks (CD's) or digital versatile disks (DVD's). The audio server may also have a large CD database that contains information on CD's such as identifiers, titles, authors, content lists, etc. Client devices such as boom boxes, computers, audio/video players can download audio/video data and information through network connectivity.

A registration procedure is typically needed to allow the audio/video server and a client device to obtain identification information for communication. Existing techniques for registration have a number of drawbacks. In a first method, command buttons are entered on both the server and the client and the two exchange information over the network. This technique is simple but unsecured. An adversary may intercept the communication and compromise the security. In a second method, an identification (ID) card containing the ID information of the client is installed in the server. The card may be a Universal Serial Bus (USB) flash memory device. This method is costly, requiring the ID card and a slot interface in the server. In a third method, the server and the client are connected with an interface cable such as USB. This method is costly and inconvenient because it requires both the server and the client to have dedicated USB interface. In the last method, a remote commander having a client ID is used to send the client ID to the server. The problem with this method is the difficulty to pair the remote unit with the client because the same ID number must be programmed in both of the remote unit and the client. There is also a chance for erroneous pairing.

BRIEF DESCRIPTION OF THE DRAWINGS

Embodiments of the invention may best be understood by referring to the following description and accompanying drawings that are used to illustrate embodiments of the invention. In the drawings.

DESCRIPTION

An embodiment of the present invention includes a technique to register a client to a server for communication. A message containing an identification (ID) code is transmitted by a client to a server using a wireless communication. A network key is fixed or randomly generated. The key encrypted with the ID code is received from the server if the key is stored in the server, or transmitted to the server if the key is stored in the client via a network. The encrypted key is decrypted using the identification code. Information is exchanged between the server and the client via the network. The information is encrypted by the sender and decrypted by the receiver using the key.

In the following description, numerous specific details are set forth. However, it is understood that embodiments of the invention may be practiced without these specific details. In other instances, well-known circuits, structures, and techniques have not been shown in order not to obscure the understanding of this description.

One embodiment of the invention may be described as a process which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a program, a procedure, a method of manufacturing or fabrication, etc.

Embodiments of the invention provide an efficient technique to provide secure device registration of a device or a client with a server in a home or small office environment. The device sends a message containing an ID code to the server via a wireless connectivity such as optical (e.g., infrared), sonic, or electromagnetic. Since the transmission of the message takes place in a home environment within a short distance (e.g., 2 meters) and within a short time period (e.g. 15 seconds), the ID code embedded in the message is transmitted in a secure manner. The server receives the message containing the ID code from the client. It then extracts the ID code from the message. The ID code is then used to encrypt a network key. The network key may be originally stored in the server or the client. The network key is encrypted using the ID code and transmitted from the sender to the receiver. The sender is the entity that stores the key originally. The receiver then uses the ID code to decrypt the encrypted key to obtain the key. After the key is obtained, the server and the client can exchange information encrypted/decrypted by the key. The ID code is used temporarily to encrypt the key during the transmission of the key from the server to the client (if the server has the key originally) or from the client to the server (if the client has the key originally). Thereafter, the ID code is not needed once the key is shared by the server and the client. Therefore, even if an adversary obtains the ID code after the registration is completed, it is not much use. The system security is enhanced. Interceptors are not able to decipher messages exchanged between the server and the client because they do not have the network key.

If the client does not have a wireless transmitter, such a transmitter may be easily installed in an inexpensive manner. The client does not need to have a wireless receiver, because only a wireless transmitter is used to transmit the ID code.

Figure 1:
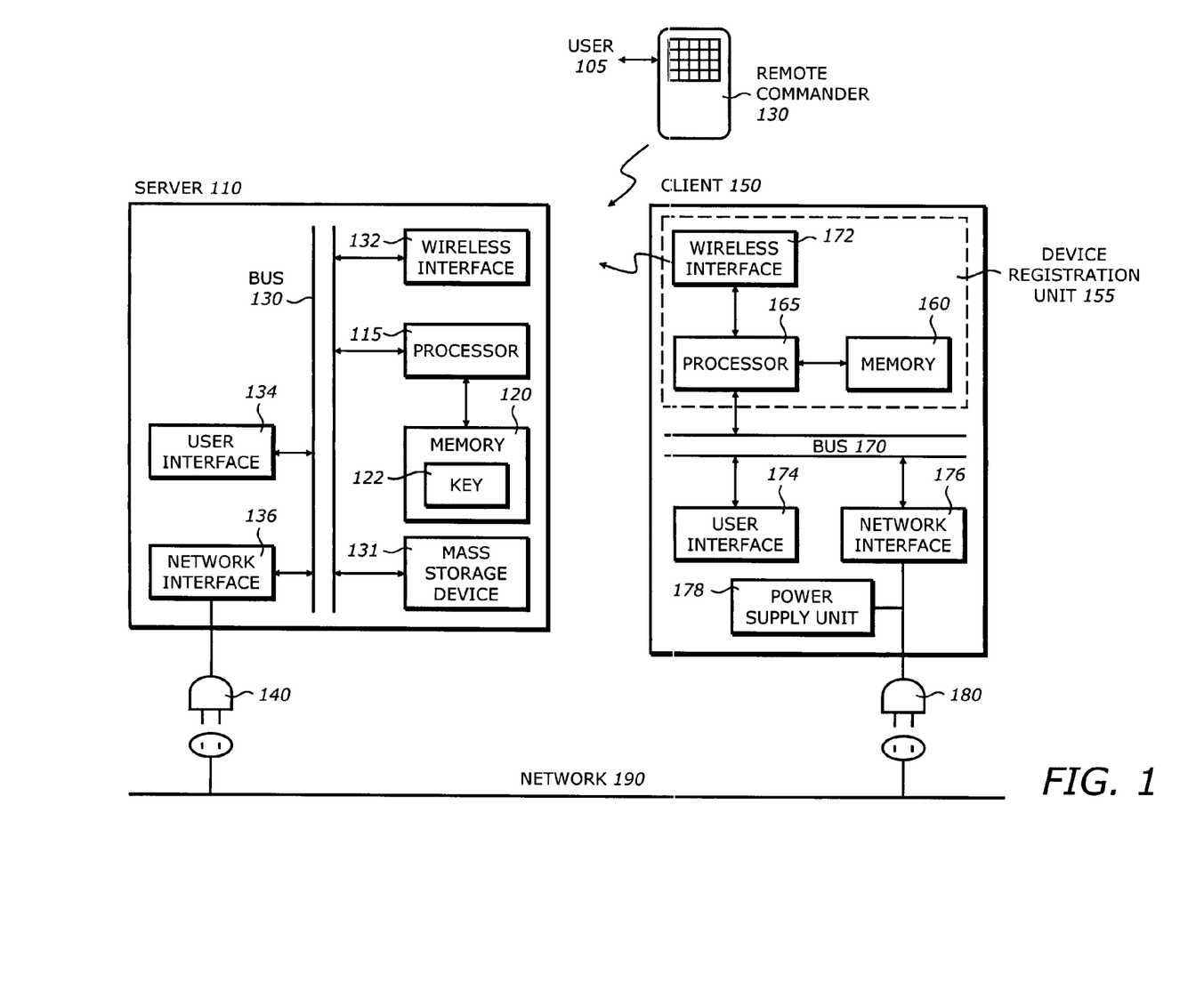
FIG. 1 is a diagram illustrating a system in which one embodiment of the invention can be practiced.

FIG. 1 is a diagram illustrating a system 100 in which one embodiment of the invention can be practiced. The system 100 includes a remote commander 130, a server 110, a client 150, and a network 190. Note that the system 100 may include more or less elements than these elements.

The remote commander 130 is a remote unit used by a user 105 to remotely control the server 110 and optionally the client 150. The remote commander 130 may have entry devices such as buttons or keypad to allow the user 105 to enter commands or to select an operation. The remote commander 130 may also have a display. The user 105 may select or enter a command to the remote commander 130 to perform operations such as enabling a device registration mode, select a format of the ID code to the server 110 and optionally the client 150, audio and/or video operations (e.g., play, pause, stop, fast review, fast forward). The remote commander 130 may have a built-in wireless interface or transmitter to transmit the ID code in a wireless connectivity such as optical (e.g., infra-red), sonic (e.g., ultrasound), and electromagnetic (e.g., Bluetooth). Note that the remote commander 130 may not be needed for device registration.

The server 110 may be an audio and/or video server. It may be configured to store audio/video data recorded from a large number of audio or video media such as compact disks (CDs) or digital versatile disks (DVDs). An example of the server 110 is the Sony DMT-PRI Bitplay audio/video system manufactured by Sony Corporation. The server 110 includes a processor 115, a memory 120, a bus 130, a mass storage device 131, a wireless interface 132, a user interface 134, and a network interface 136.

The processor 115 represents a central processing unit of any type of architecture, such as embedded processors, mobile processors, micro-controllers, digital signal processors, superscalar computers, vector processors, single instruction multiple data (SIMD) computers, complex instruction set computers (CISC), reduced instruction set computers (RISC), very long instruction word (VLIW), or hybrid architecture. The memory 120 stores program code and data. The memory 120 is typically implemented with dynamic random access memory (DRAM) or static random access memory (SRAM). It may also include non-volatile memory such as flash memory. The memory 120 stores a key 122 for cryptographic communication. The key 122 is used by the server to encrypt messages or information to be sent out and to decrypt messages or information encrypted by the key 122. The key 122 may be a factory-preset, fixed value or randomly generated In addition, as discussed above, alternatively, the key 122 may be stored in the client 150 and sent to the server 110.

The bus 130 provides interface signals to allow the processor 115 to communicate with other processors or devices such as the wireless interface 132, the user interface 134, and the network interface 136.

The mass storage device 131 stores archive information such as code, programs, files, data, applications, and operating systems. The mass storage device 131 may include a CD-ROM, a DVD, a floppy drive, and a hard drive, and any other magnetic or optic storage devices. The data may include audio and/or video data such as music, movies, graphics, animation, etc. The mass storage device 131 provides a mechanism to read machine-accessible media. The machine-accessible media may contain computer readable program code to perform tasks as described in the following.

The wireless interface 132 may include a wireless receiver to receive wireless messages sent from the remote commander 130. The wireless receiver may be an optical (e.g., infra-red) receiver, a sonic (e.g., ultrasound) receiver, or an electromagnetic (e.g., Bluetooth) receiver. The wireless interface 132 may optionally include a wireless transmitter of any of the above type. The user interface 134 provides interface to user for command entry and/or display. The user may enter commands via a keypad or buttons. The display may provide feedback information to the user.

The network interface 136 provides interface to the network 190. In one embodiment, the network 190 is a power line and the network interface 136 is a power line communication (PLC) interface. The PLC technology allows convenient, flexible, and cost-effective access to the server 110 from various clients, such as the client 150, connected to the server 110 via power lines. In addition, the use of PLC technology enhances the mobility of the clients as they can be easily moved from one physical location to another physical location without disrupting the network configuration and the accessibility to the server 110. PLC may be deployed in accordance with the "HomePlug 1.0 Specification," dated Jun. 30, 2001. The server 110 may send and receive information to and from the client 150 through the power line. The network or power plug or receptacle 140 is plugged into the socket connecting to the network or power line 190 to allow the information to be transmitted or received over the network or power line 190 from and to the PLC interface 136. It is noted that any network technology other than the PLC may be employed. This may include Ethernet, cable modem, fiber optic cable, dial-up, digital subscriber lines (xDSL), Integrated Service Data Network (ISDN), or wireless networks.

The client 150 is a client device that communicates with the server 110 via the power line 190. Typically in a home or small office environment, there may be multiple clients connecting to the server 110. For clarity, only one client 150 is shown. The client 150 may be an audio and/or video player (e.g., boom box), a media device (e.g., camera, music player), a mobile unit (e.g., cellular phone, wireless phone, personal digital assistant), a wireless fidelity (WiFi) adapter. The client 150 has similar components like the server 150, but may be with smaller, slower, or less power consumption components. The client 150 includes a device registration unit 155, a user interface 174, and a network interface 176. The device registration unit 155 includes a processor 165, a memory 160, a bus 170, and a wireless interface 172.

The client 150 may be a unit that has power cable connected to an outlet such as a wall outlet or an extension outlet. It may be moved around and located anywhere in the home or office environment. It may be placed on top of, adjacent to, or close to the server 110. It may also be a wall-mounted device that plugs directly to the electrical outlet without using a power cable.

For device registration, the client 150 may be positioned such that its wireless transmitter is directed toward the server. Typically, the user moves the client 150 close to the server 110 within the operational distance as allowed by the wireless transmitter. For example, this distance may range from 0 to 5 meters. The user 105 may then position the client 150 such that it faces the server 110 without any physical obstacle that may interfere with the wireless transmission. For a client that has a long power cord or cable, the movement of the client 150 around to position it close to the server 110 for device registration, this may not present a problem. However, when the client 150 is a wall-mounted device or when it may be cumbersome to move it around while the power cord or cable is still plugged into the outlet, it may be necessary to remove the device from the outlet or to remove the power cord or cable from the outlet for device registration. During this time, the power source may be temporary removed or unavailable. An embodiment of the invention provides a back-up supply so that the client 150 may be able to send a message containing the ID code to the server 110 during this temporary period of removing the power source. After the ID code is transmitted to the server, the client 150 may be plugged back to the outlet if it is a wall-mounted device or its power cable may be plugged back to the outlet.

The processor 165 may be any processor similar to the processor 115. In one embodiment, the processor 165 is slower and consumes less power than the processor 115. Similarly, the memory 160 is similar to the memory 120. The memory 160 may store a program to allow the processor 165 to execute instructions to perform the device registration function such as retrieving the ID code, composing a message containing the ID code, and sending the message to the wireless interface 172. The memory 160 may contain the ID code that identifies the client 150 and is used for device registration. In addition, the memory 160 may or may not contain a network key that may be sent to the server 110 in encrypted form as discussed above. The memory 160 may also store data or information to be exchanged with the server 110. In the case where the server 110 has the network key originally, the memory 160 does not contain the key 122 initially. Eventually, after device registration, the server 110 sends the key 122 encrypted with the ID code to the client 150. The client 150 may then obtain the key 122 by decrypting the encrypted key using the ID code. Similar operations are performed when the client 150 has the network key originally. The bus 170 allows the processor 165 to interface to a number of devices. The wireless interface 172 allows the device registration unit 155 to transmit a message or messages containing the ID code to the server. If enabled, the wireless interface 172 may also receive messages transmitted in a wireless connectivity from the remote commander 130, or from the server 110. The wireless interface 172 may include one of an optical (e.g., infrared) transmitter, a sonic (e.g., ultrasound) transmitter, or an electromagnetic (e.g., Bluetooth) transmitter. In case of the optical transmitter, a multi-wavelength LED may be used. For example, a dual-wavelength LED which emits both infrared and visible red light may be implemented for message transmission and power indication. The wireless interface 172 may optionally include a wireless receiver of any of the above type. The user interface 174 provides interface to the user 105 including an entry device (e.g., keypad, button) and/or display. The network interface 176 is connected to the network or power plug or receptacle 180 to allow communication between the server 110 and the client 150 to occur over the network or power line 190. The power supply unit 178 provides power to various components in the client 150. It is also connected to the power plug 180 to receive the line power. As discussed above, during device registration, the power source to the client 150 may be temporary disconnected or removed. The power supply unit 178 may include a back-up supply to allow the device registration unit 155 to perform device registration during the time period when the power source is removed or disconnected.

Figure 2A:
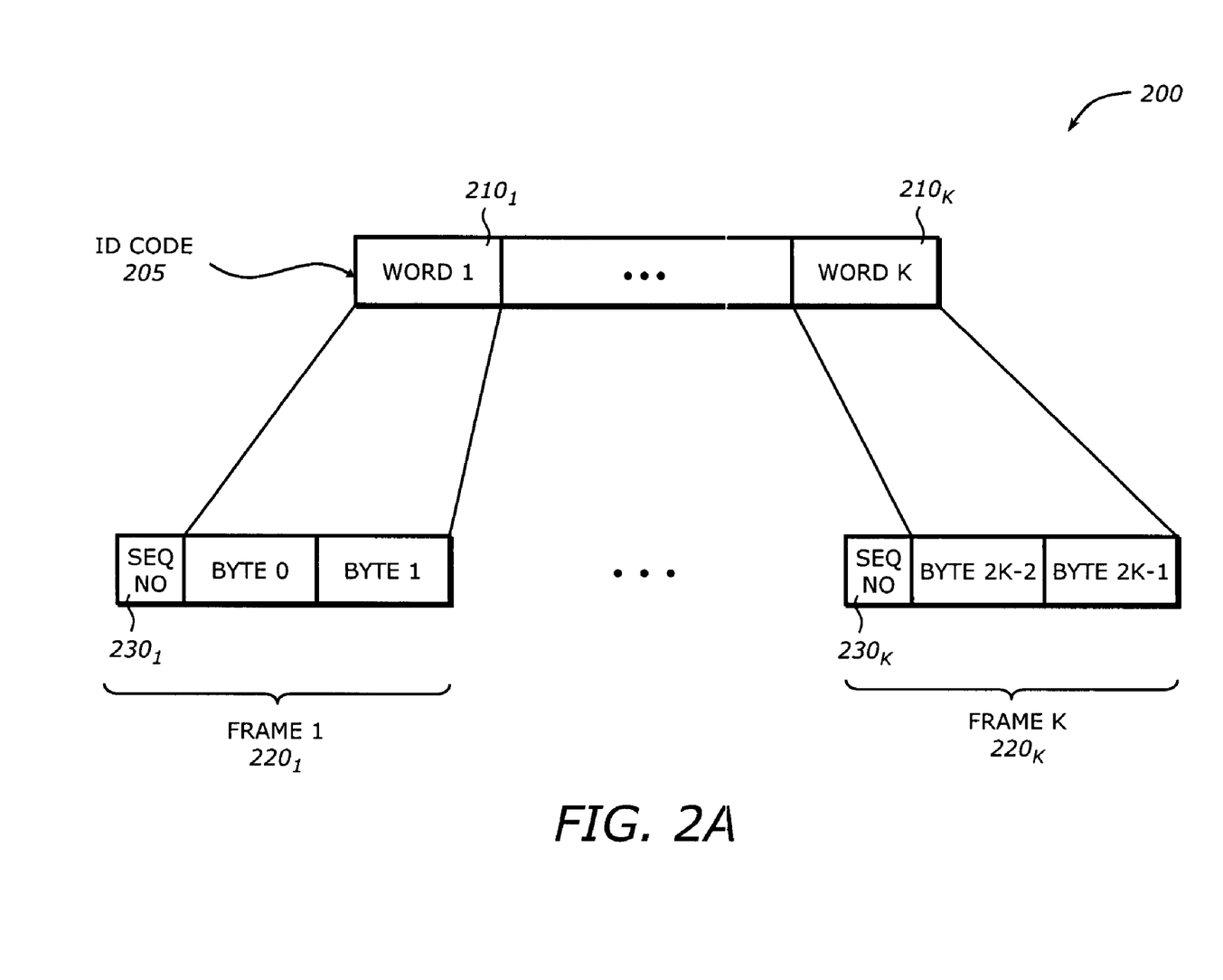
FIG. 2A is a diagram illustrating a message format according to one embodiment of the invention.

FIG. 2A is a diagram illustrating a message format 200 according to one embodiment of the invention. The message format 200 includes an ID code 205 and K frames $220_1$ to $220_K$.

The ID code 205 may include K words $210_1$ to $210_K$. In one embodiment, the ID code 205 includes 4 words or 8 bytes. Since the length of the ID code 205 may be larger than most standard sizes of existing communication protocols, the ID code 205 may be encoded to form a message for transmission using a pre-defined format. The pre-defined format may be known by both the client 150 and the server 110. In one embodiment, the pre-defined format includes breaking up the ID code 205 into K frames $220_1$ to $220_K$, each frame corresponding to a word in the ID code 205.

Each of the K frames $220_1$ to $220_K$ includes a sequence number $230_j$ (j=1, . . . , K) and two bytes corresponding to the word j of the ID code 205. The sequence number indicates the word number in the ID code 205. The sequence number therefore may include a sufficient number of bits to encode the total number of frames. In one embodiment, the sequence number $230_j$ is a 4-bit code and the size of each of the K frames $220_1$ to $220_K$ is 20-bit.

Figure 2B:
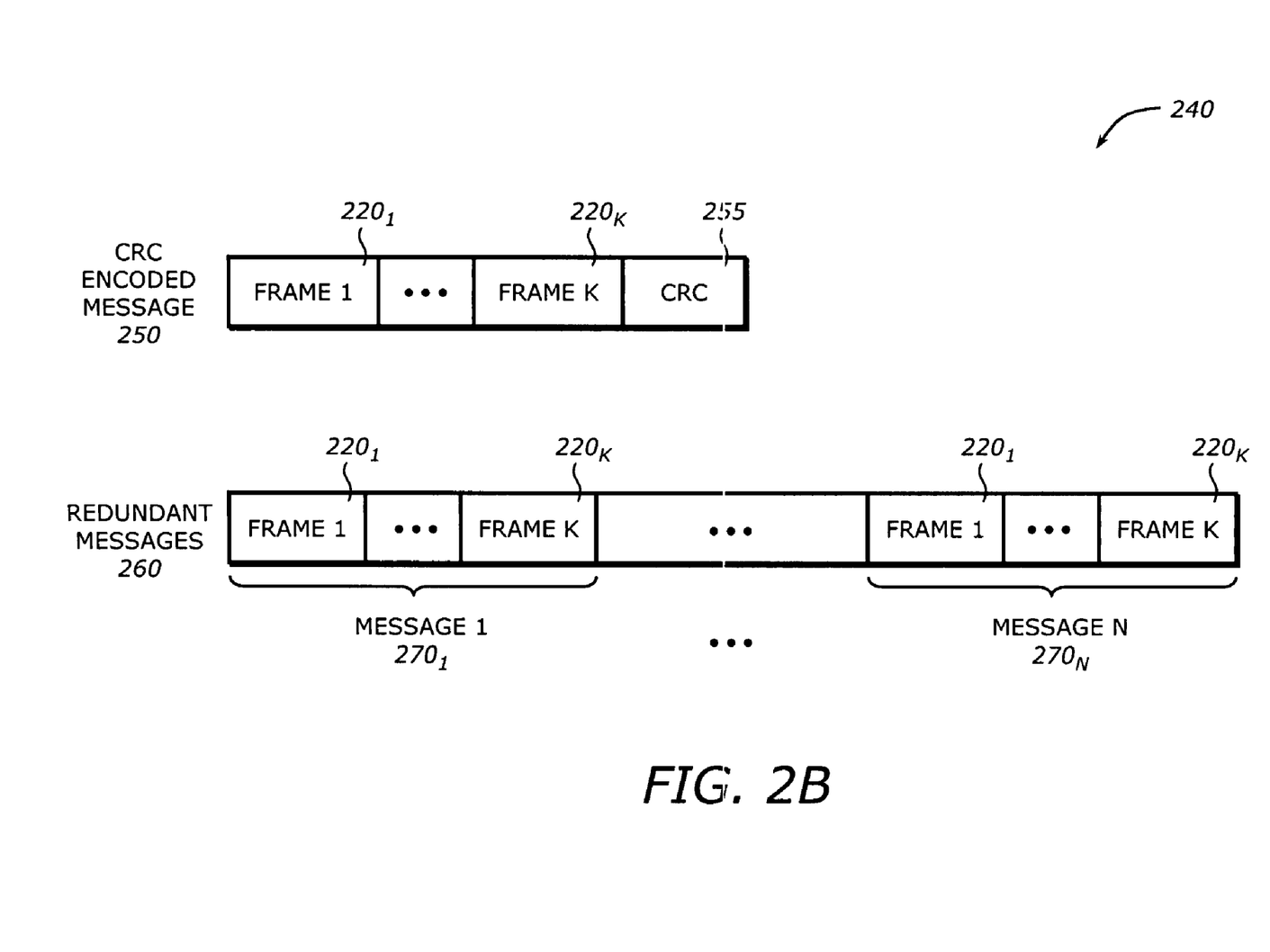
FIG. 2B is a diagram illustrating message transmissions with error checking according to one embodiment of the invention.

FIG. 2B is a diagram illustrating message transmissions 240 with error checking according to one embodiment of the invention. The message transmission 240 may include a cyclic redundant code (CRC) encoded message 250 and redundant messages 260. The message transmission 240 includes an error checking procedure to avoid receiving an erroneous ID code due to noise and interferences in the transmission of the ID code 205.

The CRC encoded message 250 includes the K frames $220_1$ to $220_K$ and a CRC 255. The CRC 255 is the CRC code for the entire K frames $220_1$ to $220_K$. When the server 110 receives the CRC encoded message 250, it may perform a decoding procedure to determine if there is an error during transmission. If there is an error, the server may flash an error indicator or display an error message on its display. The user may then command the client 150 to re-send the message containing the ID code 205.

The redundant messages 260 include N messages $270_1$ to $270_N$ where N is a positive integer greater than 1. Each of the N messages $270_1$ to $270_N$ includes the K frames $220_1$ to $220_K$. Essentially, the client 150 sends the message containing the ID code 205 redundantly. The error checking may be performed in a number of ways. In one way, the server 110 determines if at least two of the messages are the same. If they are the same, then the message is assumed to be error-free and the ID code 205 may be extracted from the message. In other way, the server 110 selects a group of messages that has the most number of identical messages and determines that this group contains an error-free ID code 205. For example, suppose N=5. There are 3 messages that are the same and 2 messages that are the same but different than the other 3 messages. The 3 identical messages may then be selected as containing the error-free ID code 205. The server 110 may then extract the ID code 205 from any of these 3 messages.

Figure 3:
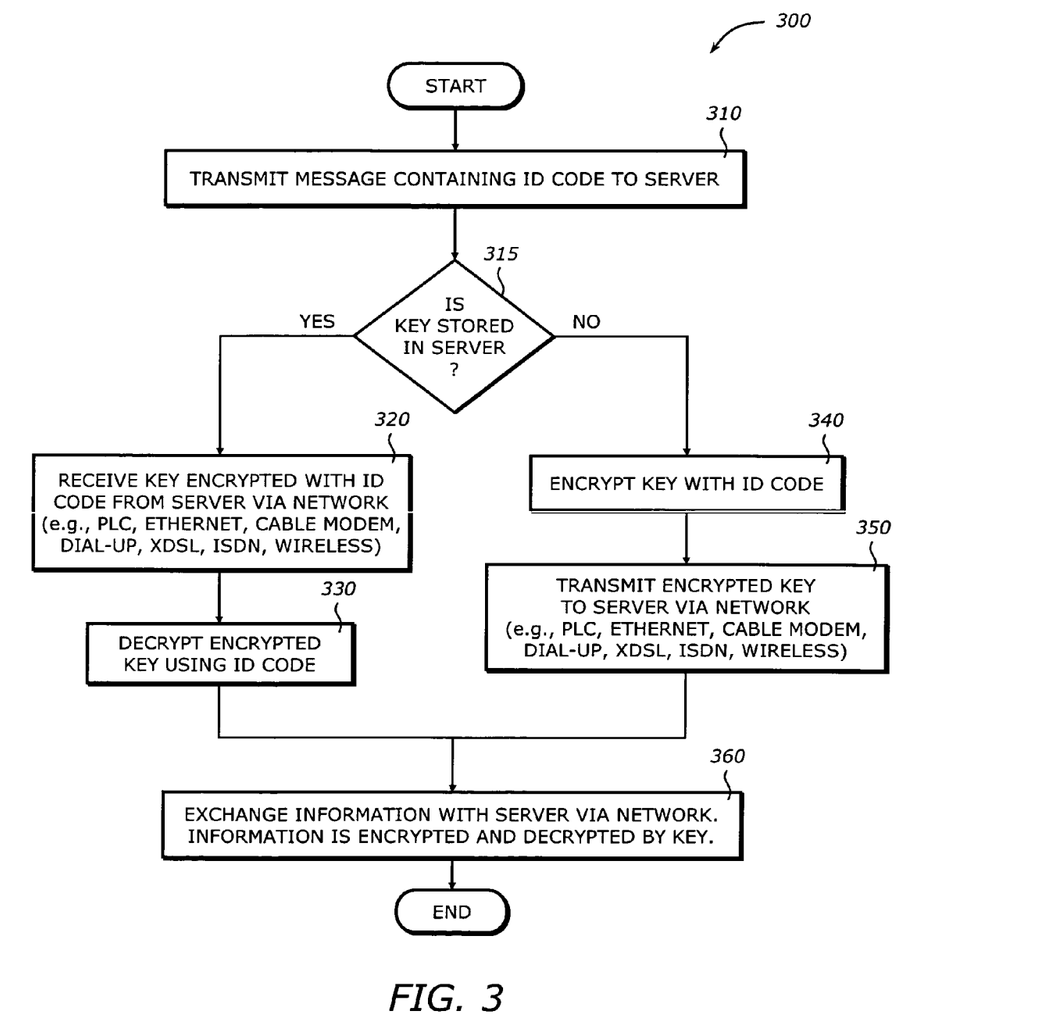
FIG. 3 is a flowchart illustrating a process to perform device registration by a client according to one embodiment of the invention.

FIG. 3 is a flowchart illustrating a process 300 to perform device registration by a client according to one embodiment of the invention.

Upon START, the process 300 transmits a message containing an identification (ID) code to a server (Block 310).

Next, the process 300 determines if a key is stored in the server (Block 315). If so, the process 300 receives the key encrypted with the ID code from the server via a network (Block 320). Any suitable encryption algorithm may be used. In one embodiment, the system supports symmetric key cryptography such as cryptography in accordance with Data Encryption Standard (DES) or Advanced Encryption Standard (AES). Public key cryptography techniques may also be employed.

Next, the process 300 decrypts the encrypted key using the ID code (Block 330). Then the process 300 exchanges information with the server via the network (Block 360). The information is encrypted and decrypted by the key. The information may include any messages, download information, audio and/or video data information (e.g., title, song), etc. The encryption and decryption techniques of the messages exchanged between the server and the client may be the same or different than the cryptography technique used by the server to send the key to the client. The process 300 is then terminated.

If the key is not originally stored in the server, i.e., it is stored in the client originally, the process 300 encrypts the key with the ID code (Block 340). As above, any suitable encryption algorithm may be used. Next, the process 300 transmits the encrypted key to the server via the network (Block 350). As above any suitable network may be used. The process 300 then proceeds to Block 360.

Figure 4:
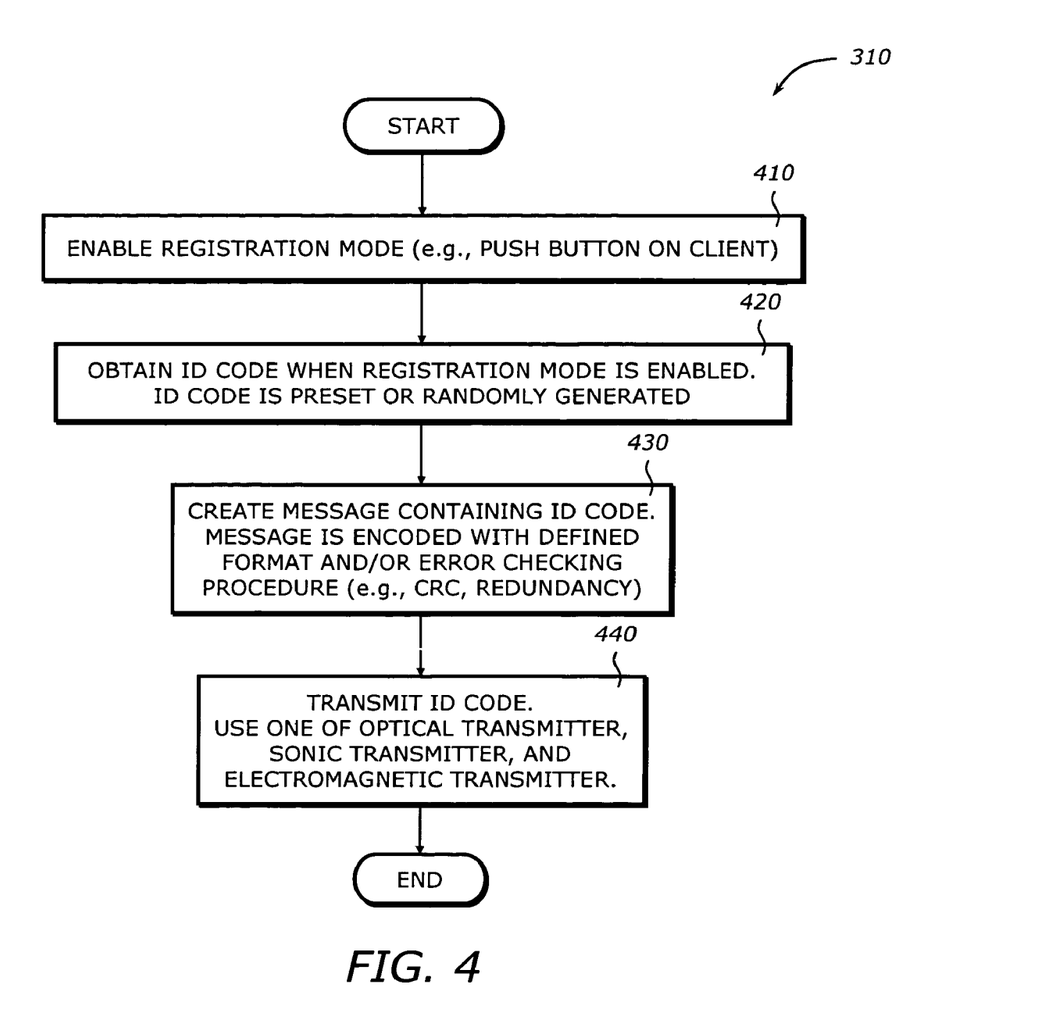
FIG. 4 is a flowchart illustrating a process to transmit the ID code by a client according to one embodiment of the invention.

FIG. 4 is a flowchart illustrating the process 310 shown in FIG. 3 to transmit message containing the ID code by a client according to one embodiment of the invention.

Upon START, the process 310 enables a device registration mode (Block 410). This operation may be performed by pushing a button or enter a command to the client. Alternatively, this operation may be optional or automatically performed when an event is triggered. For example, when it is detected that a power source becomes unavailable or removed, such as when a wall-mounted client is removed from the outlet, the device may automatically enables the device registration mode.

Next, the process 310 obtains the ID code when the device registration mode is enabled whether or not the device registration mode is automatically enabled (Block 420). This may be performed by retrieving the ID code as a preset value or generating the ID code randomly.

Then, the process 310 creates the message containing the ID code (Block 430). This may be performed by encoding the message in a pre-defined format as shown in FIG. 2A. The message may also be encoded using an error checking procedure (e.g., CRC, redundancy) as shown in FIG. 2B.

Then, the process 310 transmits the message containing the ID code using a wireless connectivity (Block 440). The transmission of the ID code may be performed using an optical transmitter, a sonic transmitter, and an electromagnetic transmitter. The process 310 is then terminated.

Figure 5:
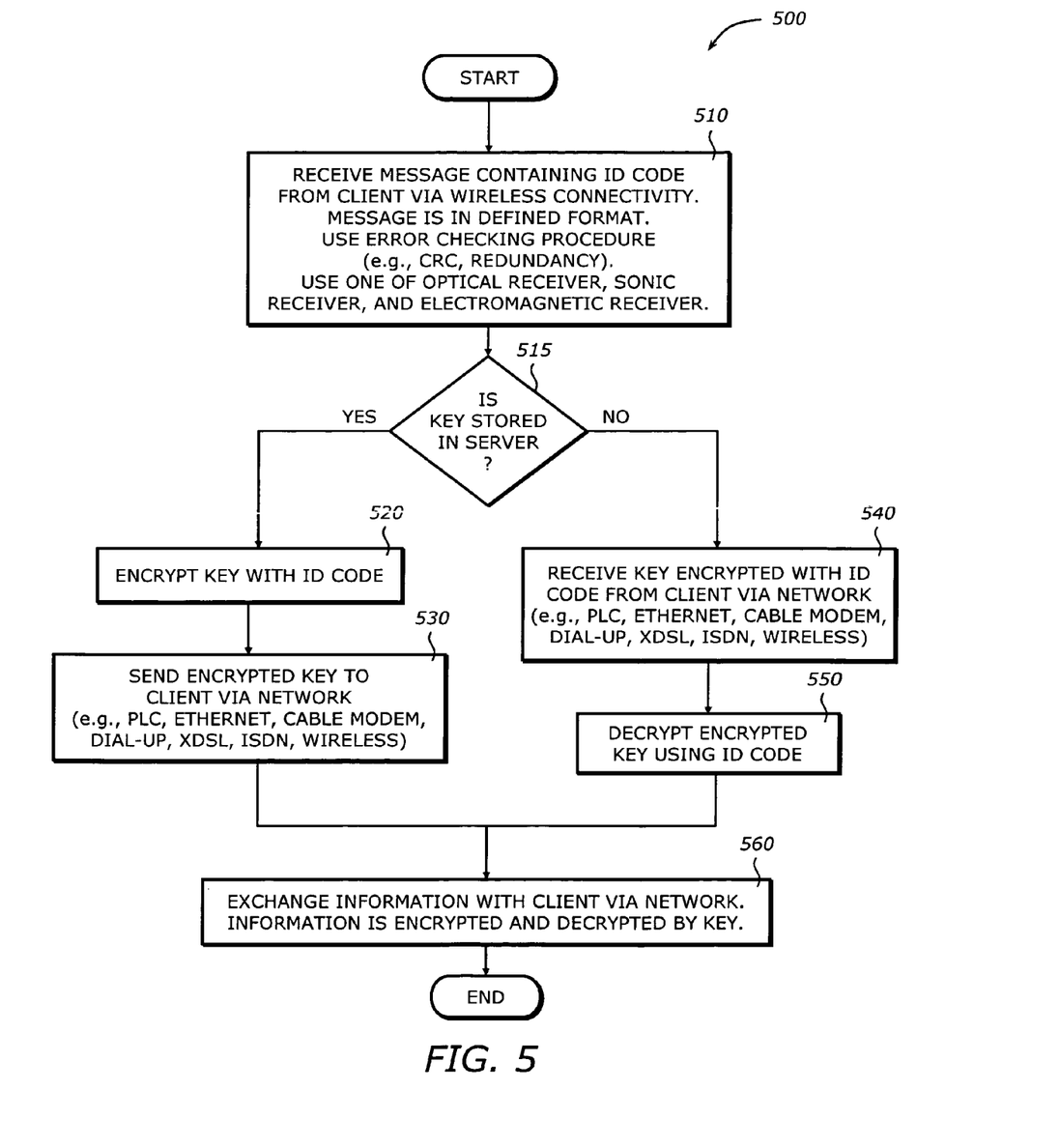
FIG. 5 is a flowchart illustrating a process to perform device registration by a server according to one embodiment of the invention.

FIG. 5 is a flowchart illustrating a process 500 to perform device registration by a server according to one embodiment of the invention.

Upon START, the process 500 receives a message containing an ID code from a client via a wireless connectivity (Block 510). The client may be a media device such as a camera, a music player, or a mobile device such as a personal digital assistant (PDA), a game console, etc. This may be performed by using an optical receiver, a sonic receiver, and an electromagnetic receiver. The message may be encoded using a pre-defined format. It may also be encoded using an error checking procedure (e.g., CRC, redundancy).

Next, the process 500 determines if a network key is stored in the server (Block 515). If so, the process 500 encrypts a key with the ID code (Block 520). Then, the process 500 sends the encrypted key to the client via a network (Block 530). The network may be any suitable network established between the server and the client. It may be a PLC network, an Ethernet, cable modem, dial-up, xDSL, ISDN, or a wireless network. Next, the process 500 exchanges information with the client via the network (Block 560). The information is encrypted by the sender and decrypted by the receiver using the key. Since the information is encrypted, it is secure and is not exposed to an intruder who may intercept the information through the network. The process 500 is then terminated.

If the network key is not stored in the server, i.e., it is stored in the client originally, then the process 500 receives a key encrypted with the ID code from the client via the network (Block 540). As above, the network may be any appropriate network. Next, the process 500 decrypts the encrypted key using the ID code (Block 550) and then proceeds to Block 560 as described above.

Figure 6:
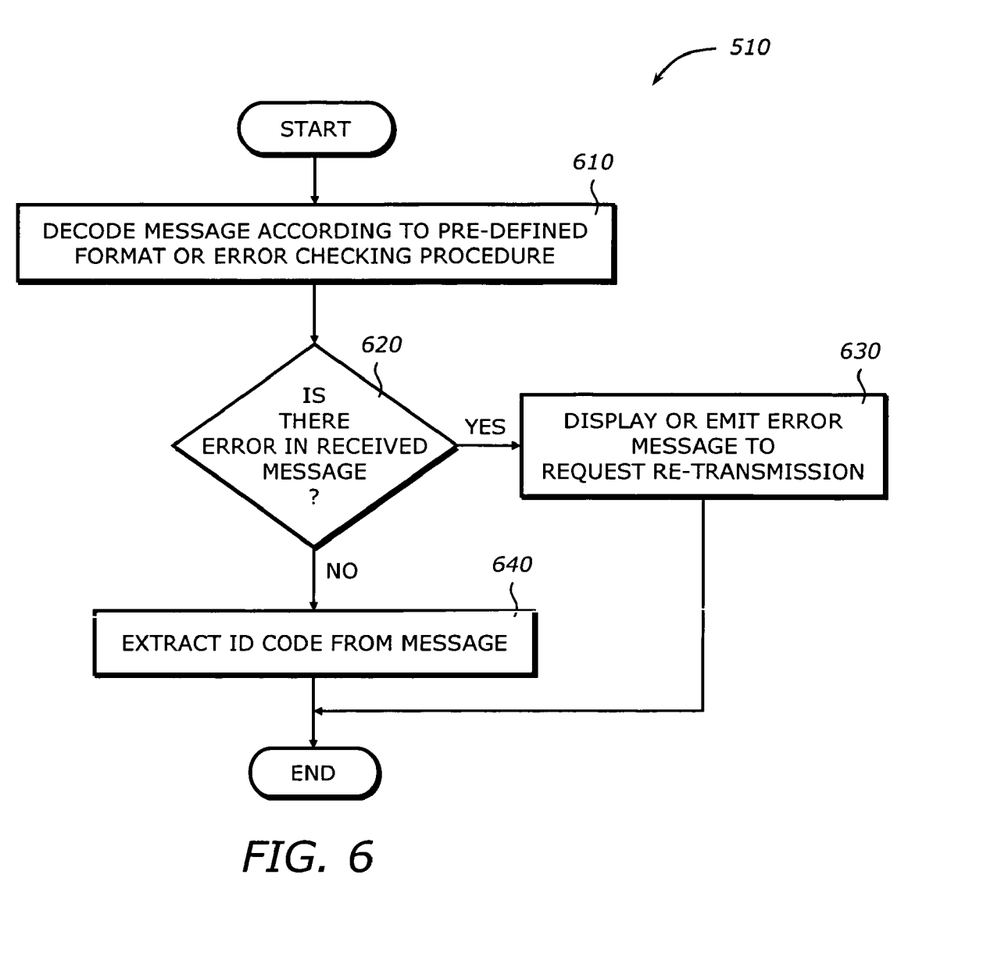
FIG. 6 is a flowchart illustrating a process to receive the message according to one embodiment of the invention.

FIG. 6 is a flowchart illustrating a process 510 shown in FIG. 5 to receive the message according to one embodiment of the invention.

Upon START, the process 510 decodes the message according to the pre-defined format and/or the error checking procedure (Block 610). Next, the process 510 determines if there is any error in the received message (Block 620). If so, the process 510 displays or emits an error message to request re-transmission (Block 630) and is then terminated. This may be performed by displaying the error message on the display, flashing an error indicator, or generates an audible sound to indicate that there is an error in the received message. If there is no error, the process 510 extracts the ID code from the message (Block 640) and is then terminated.

Figure 7:
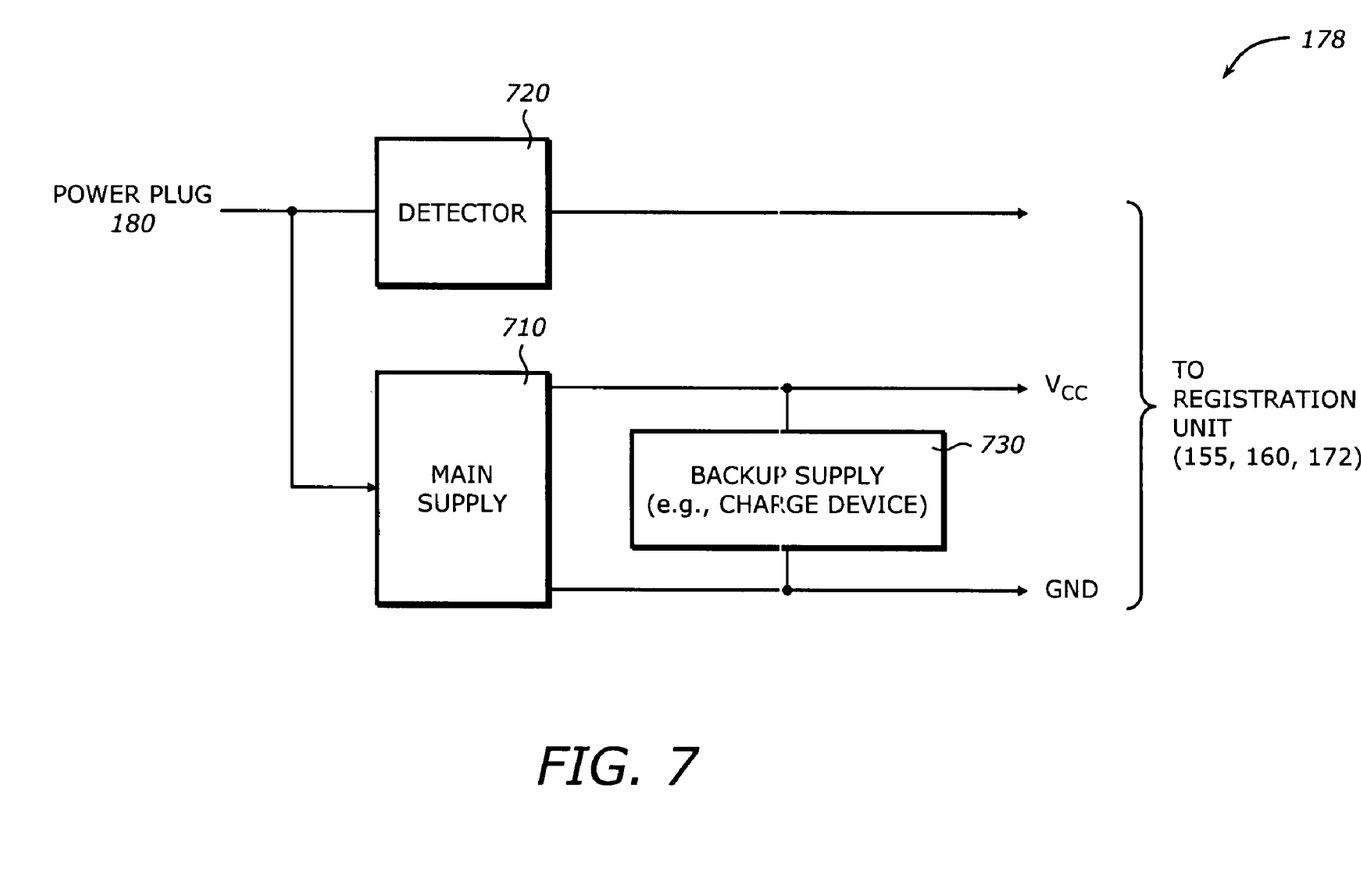
FIG. 7 is a diagram illustrating a power supply unit according to one embodiment of the invention.

FIG. 7 is a diagram illustrating the power supply unit 178 shown in FIG. 1 according to one embodiment of the invention. The power supply unit 178 includes a main supply 710, a detector 720, and a back-up supply 730.

The main supply 710 provides main power supply to the components of the client 150 include the device registration unit 155, the user interface 174, the network interface 176, and other functional circuits or units (e.g., camera sensor circuit, Wi-Fi adapter circuit) of the client 150. The main supply 710 receives the line power from the power plug or receptacle 180. Typically it includes a power converter to convert the alternating current (AC) power from the line power to direct current (DC) power. It may include a transformer, a rectifier circuit, and a voltage regulator. The power supply is available at the Vcc and ground (GND) terminals.

The detector 720 monitors the power source from the power plug 180 and detects if the power source to the main supply 710 is disconnected or removed. It asserts a detect signal to the device registration unit 155 or the processor 165 to indicate that the power line is removed. The detect signal may be used to interrupt the processor 165 so that the processor 165 may enter a device registration mode to start registering the client 150 to the server 110. The detector 720 may monitor the Vcc instead of the AC line.

The back-up supply 730 is connected to the main supply 710 at the Vcc and GND terminals to provide back-up power to the device registration unit 155 when the power source is removed. The back-up supply 730 may include a charge device to charge power when the power source is available. The charged power provides the back-up power during a time period when the power source is removed. The charge device may be a capacitor having a time constant corresponding to the time period. The capacitor may be a suitable capacitor such as an electrolytic capacitor having a capacitance selected to provide the proper time constant. It may also be a rechargeable battery having a recharge capacity corresponding to the time period. The rechargeable battery may be one of a nickel cadmium (Ni—Cd) battery, a nickel metal hydride (NiMH) battery, a lithium ion battery, a lithium ion polymer battery, a nickel zinc battery, a super iron battery, and an alkaline battery.

The time period may be sufficiently long for the device registration unit to successfully transmit the message to the server. Typically, the time period may be approximately a few seconds to thirty seconds. The time period may include the time it takes to position the client device to face toward the server and the time to transmit the message. Usually, it takes a longer time to place the device in a proper position than to transmit the message. A successful transmission indicates that the server has received the message.

When the detector 720 detects that the power source is removed, it asserts the detect signal to interrupt the processor. During that time, the main supply 710 may be dropped to below some predefined threshold. The power is then switched to the back-up power provided by the back-up supply 730. The back-up supply 730 needs only to provide sufficient power for a successful transmission of the message containing the ID code. To optimize the power usage, the back-up supply 730 may need to provide power only to the registration unit 155. This may help reducing the size of the back-up supply 730. For example, the capacitor may be of smaller size.

Upon receiving the detect signal from the detector 720, the device registration unit 155 may enter the registration mode immediately and begin transmitting the message containing the ID code. To ensure that the server 110 receives the message, the device registration unit 155 may transmit the message repeatedly during the time period when the power source is removed. The server 110 may be programmed to recognize that a registration mode is in effect when it receives a pattern of data repeatedly within a short time period. In a way, this repeated transmission may be considered as a redundant message transmission as part of an error checking procedure described earlier. The message may be transmitted as described above such as in a pre-defined format and/or using an error checking procedure (e.g., CRC, redundancy).

Figure 8:
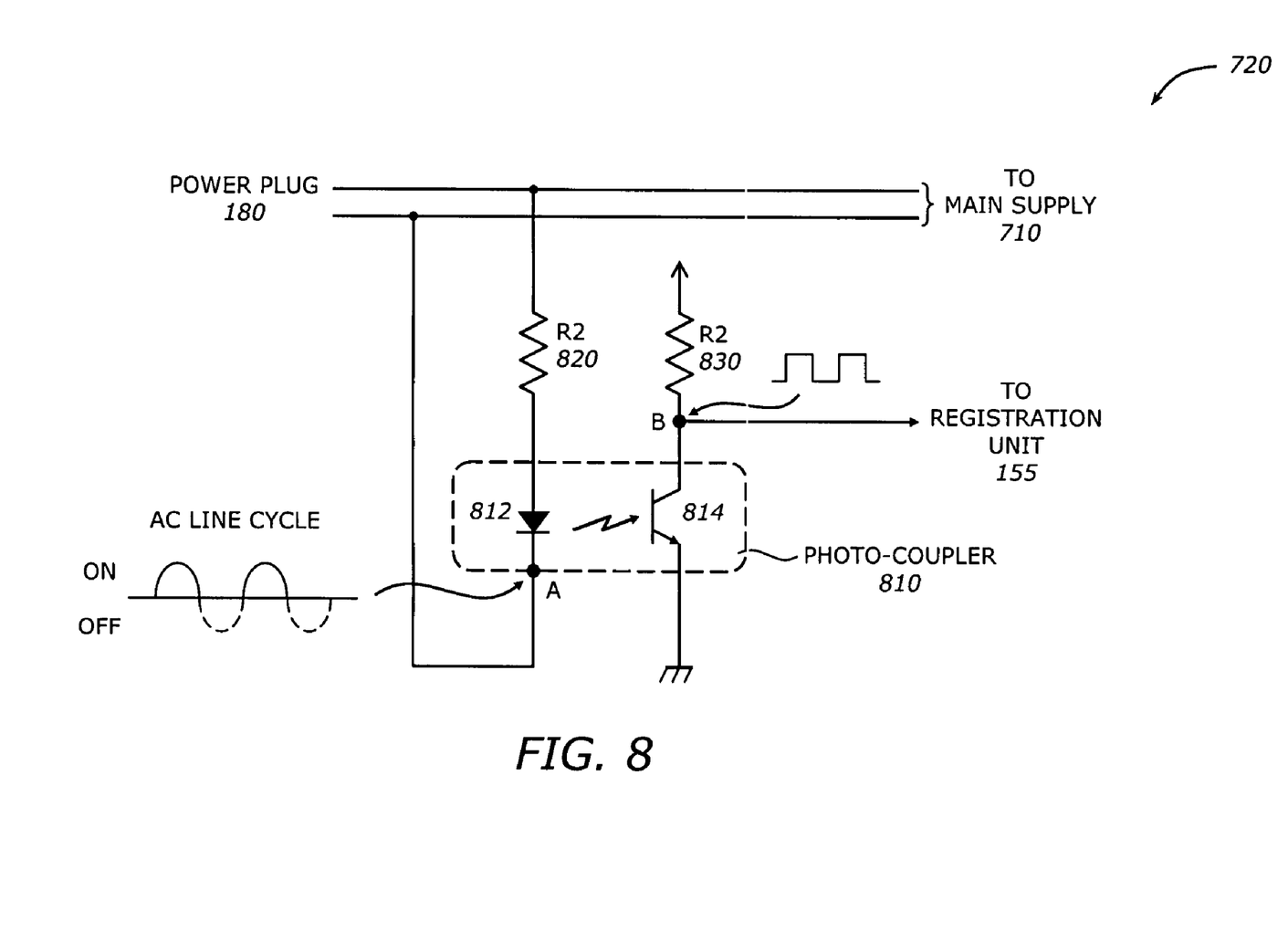
FIG. 8 is a diagram illustrating a detector according to one embodiment of the invention.

FIG. 8 is a diagram illustrating the detector 720 according to one embodiment of the invention. The detector 720 includes a photo-coupler 810 and resistors $R_1$ 820 and $R_2$ 830. Note that the embodiment in FIG. 8 only shows an exemplary circuit for the detector 720. Other circuits achieving similar functions may be implemented.

The photo-coupler 810 includes a diode 812 and a switching element 814. The diode 812 acts as a rectifier to rectify the AC current from the power line. It also emits light to the switching element 814. The light intensity of the diode 812 may be proportional to the current amplitude that passes through the diode 812. Due to the rectifier action, the output current of the diode at point A is an AC line voltage as shown with half cycles in the positive region corresponding to the ON time of the diode 812. The switching element 814 may be a transistor that is switched on or off according to the input to the gate which is responsive to the light intensity emitted by the diode 812. When the driving current has a half-wave curve as shown at point A, the transistor 814 generates a square wave having the same frequency as the power line signal. The voltage level of the square wave may be adjusted to match the voltage requirement of the registration unit 155.

The resistor $R_1$ 820 may be used as a current limiting device to provide proper current through the diode 812. The resistor $R_2$ 830 may be a pull-up resistor to help shape the ON time of the transistor 814. One end of the resistor $R_2$ 830 is connected to the output of the transistor 814. The other end of the resistor is connected to the DC supply as provided by the main supply 710 or any other suitable source.

When the power is removed, the photo-coupler 810 is turned off. The resistor $R_2$ 830 pulls the output voltage up to a HIGH level. This transition corresponds to a detect signal that triggers an event to the registration unit 155, interrupting the processor 165. The processor 165 may constantly or periodically monitor the detect signal. The detect signal may be latched in a storage and is read by the processor 165. Since the timing of the square wave may be typically known, the program run by the processor 165 may contain code to determine when this square becomes a constant HIGH level for more than one period of the square wave. If so, the process 165 may execute instructions to send the message containing the ID code. When the power supply goes below the minimum operational voltage, the processor 165 may stop running.

Figure 9:
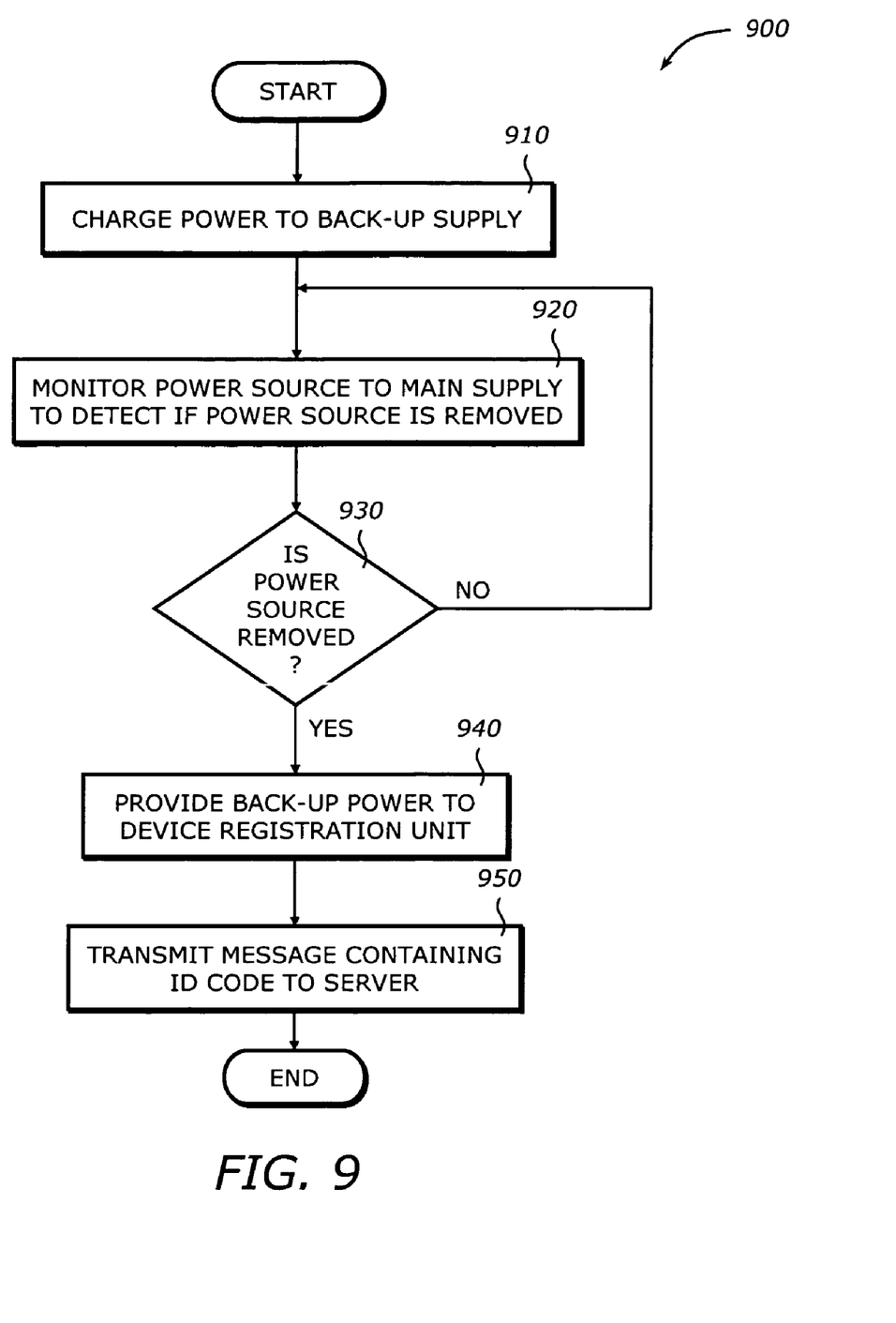
FIG. 9 is a flowchart illustrating a process to perform device registration by a client using back-up supply according to one embodiment of the invention.

FIG. 9 is a flowchart illustrating a process to perform device registration by a client using back-up supply according to one embodiment of the invention.

Upon START, the process 8900 charges power to a back-up supply (Block 910). This is done automatically when the client is powered on. The back-up supply may be a charging device such as a capacitor or a rechargeable battery. Next, the process 900 monitors a power source to a main supply to detect if the power source is removed (Block 920). The power source may be the line power from the power plug 180 shown in FIG. 1.

Then, the process 900 determines if the power source is removed (Block 930). If not, the process 900 returns to Block 920. Otherwise, the process 900 provides back-up power to the device registration unit (Block 940). Next, the process 900 transmits a message containing the ID code to the server (Block 950) and is then terminated. The message may be transmitted repeatedly during the time period until the power supply goes below the minimum operational voltage.

Elements of one embodiment of the invention may be implemented by hardware, firmware, software or any combination thereof. The term hardware generally refers to an element having a physical structure such as electronic, electromagnetic, optical, electro-optical, mechanical, electromechanical parts, etc. The term software generally refers to a logical structure, a method, a procedure, a program, a routine, a process, an algorithm, a formula, a function, an expression, etc. The term firmware generally refers to a logical structure, a method, a procedure, a program, a routine, a process, an algorithm, a formula, a function, an expression, etc., that is implemented or embodied in a hardware structure (e.g., flash memory, ROM, EPROM). Examples of firmware may include microcode, writable control store, micro-programmed structure. When implemented in software or firmware, the elements of an embodiment of the present invention are essentially the code segments to perform the necessary tasks. The software/firmware may include the actual code to carry out the operations described in one embodiment of the invention, or code that emulates or simulates the operations. The program or code segments can be stored in a processor or machine accessible medium or transmitted by a computer data signal embodied in a carrier wave, or a signal modulated by a carrier, over a transmission medium. The "processor readable or accessible medium" or "machine readable or accessible medium" may include any medium that can store, transmit, or transfer information. Examples of the processor readable or machine accessible medium include an electronic circuit, a semiconductor memory device, a read only memory (ROM), a flash memory, an erasable programmable ROM (EPROM), a floppy diskette, a compact disk (CD) ROM, an optical disk, a hard disk, a fiber optic medium, a radio frequency (RF) link, etc. The computer data signal may include any signal that can propagate over a transmission medium such as electronic network channels, optical fibers, air, electromagnetic, RF links, etc. The code segments may be downloaded via computer networks such as the Internet, Intranet, etc. The machine accessible medium may be embodied in an article of manufacture. The machine accessible medium may include data that, when accessed by a machine, cause the machine to perform the operations described above. The machine accessible medium may also include program code embedded therein. The program code may include machine readable code to perform the operations described above. The term "data" here refers to any type of information that is encoded for machine-readable purposes. Therefore, it may include program, code, data, file, etc.

All or part of an embodiment of the invention may be implemented by hardware, software, or firmware, or any combination thereof. The hardware, software, or firmware element may have several modules coupled to one another. A hardware module is coupled to another module by mechanical, electrical, optical, electromagnetic or any physical connections. A software module is coupled to another module by a function, procedure, method, subprogram, or subroutine call, a jump, a link, a parameter, variable, and argument passing, a function return, etc. A software module is coupled to another module to receive variables, parameters, arguments, pointers, etc. and/or to generate or pass results, updated variables, pointers, etc. A firmware module is coupled to another module by any combination of hardware and software coupling methods above. A hardware, software, or firmware module may be coupled to any one of another hardware, software, or firmware module. A module may also be a software driver or interface to interact with the operating system running on the platform. A module may also be a hardware driver to configure, set up, initialize, send and receive data to and from a hardware device. An apparatus may include any combination of hardware, software, and firmware modules.

While the invention has been described in terms of several embodiments, those of ordinary skill in the art will recognize that the invention is not limited to the embodiments described, but can be practiced with modification and alteration within the spirit and scope of the appended claims. The description is thus to be regarded as illustrative instead of limiting.

What is claimed is:

1. A method comprising:
    configuring at least one processor device to perform the functions of:
    transmitting a message containing an identification (ID) code, the ID code being encoded with an error checking code, to a server;
    wherein in response to a key stored in the server, receiving the key encrypted with the ID code from the server via a network, and decrypting the encrypted key using the ID code;
    wherein in response to a key not stored in the server, encrypting the key using the ID code, and transmitting the key encrypted with the ID code to the server via the network; and
    exchanging information with the server via the network, the information being encrypted and decrypted by the key.

2. The method of claim 1 wherein transmitting comprises:
    enabling a device registration mode;
    obtaining the ID code when the device registration mode is enabled; and
    transmitting the message containing the ID code using a wireless connectivity.

3. The method of claim 2 wherein obtaining the ID code comprises:
    obtaining the ID code being one of a preset value and a randomly generated value.

4. The method of claim 2 wherein transmitting the message comprises:
    encoding the message in a pre-defined format.

5. The method of claim 2 wherein transmitting the message comprises:
    encoding the message using an error checking procedure.

6. The method of claim 5 wherein encoding the message using an error checking procedure comprises at least one of:
    encoding the ID code with an error checking code; and
    encoding the message using redundancy.

7. The method of claim 1 wherein transmitting the message comprises:
    transmitting the message using one of an optical transmitter, a sonic transmitter, and an electromagnetic transmitter.

8. The method of claim 7 wherein the optical transmitter is a multi-wavelength optical transmitter.

9. The method of claim 1 wherein the network is one of a power line communication (PLC) network, an Ethernet, a cable modem, a dial-up, a xDSL, an ISDN, and a wireless network.

10. A method comprising:
    configuring at least one processor device to perform the functions of:
    receiving a message containing an identification (ID) code, the ID code being encoded with an error checking code, from a client via a wireless connectivity;
    wherein in response to a key stored in a server, encrypting the key with the ID code; sending the encrypted key to the client via a network;
    wherein in response to a key not stored in the server, receiving the key encrypted with the ID code from the client, and decrypting the encrypted key using ID code; and
    exchanging information with the client via the network, the information being encrypted and decrypted by the key.

11. The method of claim 10 wherein receiving the message comprises:
    receiving the message in a pre-defined format; and
    extracting the ID code from the message.

12. The method of claim 10 wherein receiving the message comprises:
    decoding the message using an error checking procedure; and
    extracting the ID code from the message.

13. The method of claim 12 wherein decoding the message using an error checking procedure comprises at least one of:
    decoding the message with an error checking code; and
    decoding the message using redundancy.

14. The method of claim 10 wherein receiving the message comprises:
    receiving the message using one of an optical receiver, a sonic receiver, and an electromagnetic receiver.

15. The method of claim 10 wherein the network is one of a power line communication (PLC) network, an Ethernet, a cable modem, a dial-up, a xDSL, an ISDN, and a wireless network.

16. An apparatus comprising:
a processor device;
a memory coupled to the processor to store instructions;
a user interface coupled to the processor to receive a user command entered by a user; and
a wireless interface coupled to the processor;
wherein the instructions, when executed by the processor, causes the processor to perform operations comprising:
transmitting message containing an identification (ID), the ID code being encoded with an error checking code, code to a server via the wireless interface upon receiving the user command,
wherein in response to a key stored in the server, receiving the key encrypted with the ID code from the server via a network, and decrypting the encrypted key using the ID code,
wherein in response to a key not stored in the server, encrypting the key using the ID code, and transmitting the key encrypted with the ID code to the server via the network; and
exchanging information with the server via the network, the information being encrypted and decrypted by the key.

17. The apparatus of claim 16 wherein the instructions causing the processor to perform transmitting comprises instructions, when executed by the processor, causes the processor to perform operations comprising:
enabling a device registration mode;
obtaining the ID code when the device registration mode is enabled; and
transmitting the message containing the ID code using a wireless connectivity.

18. The apparatus of claim 17 wherein the instructions causing the processor to perform obtaining the ID code comprises instructions, when executed by the processor, causes the processor to perform operations comprising:
obtaining the ID code being one of a preset value and a randomly generated value.

19. The apparatus of claim 17 wherein the instructions causing the processor to perform transmitting the message comprises instructions, when executed by the processor, causes the processor to perform operations comprising;
encoding the message in a pre-defined format.

20. The apparatus of claim 17 wherein the instructions causing the processor to perform transmitting the message comprises instructions, when executed by the processor, causes the processor to perform operations comprising:
encoding the message using an error checking procedure.

21. The apparatus of claim 20 wherein the instructions causing the processor to perform transmitting the message using an error checking procedure comprises instructions, when executed by the processor, causes the processor to perform operations comprising at least one of:
encoding the message with an error checking code; and
encoding the message using redundancy.

22. The apparatus of claim 16 wherein the instructions causing the processor to perform transmitting the message comprises instructions, when executed by the processor, causes the processor to perform operations comprising:
transmitting the message using one of an optical transmitter, a sonic transmitter, and an electromagnetic transmitter.

23. The apparatus of claim 22 wherein the optical transmitter is a multi-wavelength optical transmitter.

24. The apparatus of claim 16 wherein the network is one of a power line communication (PLC) network, an Ethernet, a cable modem, a dial-up, a xDSL, an ISDN, and a wireless network.

25. A system comprising:
a server having a key; and
a client coupled to the server via a network and a wireless connectivity, the client, having at least one processor device, transmitting a message containing an identification (ID) code, the ID code being encoded with an error checking code, to the server via a wireless interface upon receiving a user command;
wherein in response to a key stored in the server, upon receiving the message, the server extracts the ID code, encrypts the key with the ID code and sends the encrypted key to the client via the network, and the client decrypts the encrypted key using the ID code, and
wherein in response to a key not stored in the server, receiving the key encrypted with the ID code from the client, and decrypting the encrypted key using ID code, the key being used to encrypt and decrypt information exchanged between the server and the client.

26. The system of claim 25 wherein the client transmits the message using an error checking procedure.

27. The system of claim 25 wherein the wireless connectivity is one of an optical connectivity, a sonic connectivity, and an electromagnetic connectivity.

28. The system of claim 25 wherein the ID code is one of a preset value and a randomly generated value.

29. The system of claim 25 wherein the client encodes the message in a pre-defined format.

30. The system of claim 25 wherein the server is a media server.

31. The system of claim 25 wherein the client is one of a media device, a mobile device, and a wall-mounted device.

32. The system of claim 25 wherein the network is one of a power line communication (PLC) network, an Ethernet, a cable modem, a dial-up, a xDSL, an ISDN, and a wireless network.

* * * * *